(12) United States Patent
Casey

(10) Patent No.: US 7,251,997 B1
(45) Date of Patent: Aug. 7, 2007

(54) FUEL TANK MODULE CONTROL SYSTEM

(75) Inventor: Gary Casey, Thousand Oaks, CA (US)

(73) Assignee: Kavlico Corporation, Moorpark, CA (US)

( * ) Notice: Subject to any disclaimer, the term of this patent is extended or adjusted under 35 U.S.C. 154(b) by 77 days.

(21) Appl. No.: 10/901,829

(22) Filed: Jul. 28, 2004

(51) Int. Cl.
*G01F 23/14* (2006.01)

(52) U.S. Cl. .................................. 73/290 R

(58) Field of Classification Search ............. 73/280 R, 73/299
See application file for complete search history.

(56) References Cited

U.S. PATENT DOCUMENTS

| | | | |
|---|---|---|---|
| 1,508,969 A * | 9/1924 | Guichard ................ 73/290 R |
| 2,368,616 A | 2/1945 | Rosenberger ............. 73/299 |
| 4,343,184 A | 8/1982 | Jaulmes ................... 73/299 |
| 4,541,367 A * | 9/1985 | Lindberg ................ 123/25 M |
| 5,661,228 A | 8/1997 | Young ...................... 73/40 |
| 6,164,325 A * | 12/2000 | Braun ..................... 137/557 |
| 6,301,955 B1 * | 10/2001 | Cook et al. ............. 73/49.7 |
| 6,339,960 B1 | 1/2002 | Costley et al. ........... 73/579 |
| 6,463,965 B1 * | 10/2002 | Rasche et al. ........... 141/65 |
| 6,488,015 B2 | 12/2002 | Isobe .................... 123/520 |
| 6,792,918 B1 * | 9/2004 | Halsall ................... 123/446 |
| 6,889,546 B2 * | 5/2005 | Shost et al. .............. 73/291 |
| 6,907,780 B1 * | 6/2005 | Meagher .................. 73/299 |
| 2003/0037599 A1 | 2/2003 | Penschuck et al. ......... 73/49.2 |
| 2003/0075156 A1 | 4/2003 | Morinaga et al. ........... 123/520 |

OTHER PUBLICATIONS

[Design Briefs] Protect MOSFET Driver from Reverse-Battery Connection, Mark Cherry, ED Online ID #3071, Website: http://www.elecdesign.com/Articles/Index.cfm?ArticleID=3071, Mar. 17, 2003.

* cited by examiner

*Primary Examiner*—Hezron Williams
*Assistant Examiner*—Ryan Christensen
(74) *Attorney, Agent, or Firm*—Jeffer Mangels Butler & Marmaro LLP

(57) ABSTRACT

A fuel tank module control system configured to measure fuel level and fuel tank vapor pressure, the system having an aspirator to use air or liquid fuel to vapor, an oscillator cyclically producing pressurized vapor, and a pressure sensor that alternately measures the pressurized vapor provided by the oscillator and the pressure of a fuel column. A check valve is provided downstream of the sensor to restrict the flow of vapor in a single direction. To determine the fuel level, the differential of the square wave output of the sensor is calculated. To determine if there are any leaks in the fuel tank, the tank vapor pressure is measured when the engine is off.

16 Claims, 3 Drawing Sheets

FUEL TANK MODULE CONTROL SYSTEM

FIELD OF THE INVENTION

The present invention relates generally to sensors, and more particularly to a fuel tank module that utilizes a single sensor to measure fuel tank vapor pressure and fuel level.

BACKGROUND OF THE INVENTION

A fuel tank of a gasoline-powered passenger car typically includes a fuel level sensor and a fuel tank pressure sensor. The fuel level sensor measures the amount of fuel remaining in the fuel tank so that the driver is alerted when the fuel level is low. By monitoring the fuel level measurements, the driver can refuel, as necessary, and can avoid the inconvenience of running out of fuel while driving.

The fuel tank pressure sensor measures the fuel tank pressure with respect to the atmosphere and detects leaks in the fuel venting system. In the United States, leak detection devices are currently required under the Environmental Protection Agency's "OBD II" requirements. Although leak detection algorithms can vary, a typical leak detector system closes the vent and then measures the tank pressure for a number of hours after the engine is shut off. Because the system is sealed and the engine has been shut off for some time, the temperature drops and the fuel vapor contracts, creating a partial vacuum. If the sensor measures a negative pressure relative to the atmosphere, it determines that the vent system is leak-free.

A typical method of measuring fluid level is to utilize a sensor for measuring the pressure of the fluid column. These types of sensors are generally used in connection with household appliances, such as washing machines. In a typical implementation, the sensor is placed at the top of the appliance and an open-ended tube is positioned in the tank (or tub, in the case of a washing machine). When the tank is filled, the resulting pressure in the tube containing air is measured. The pressure in the tube is proportional to the fluid level and therefore, the fluid level can be ascertained. A disadvantage of such a sensor is that if the tube is immersed in liquid for an extended period of time, the air in the tube eventually dissolves in the surrounding liquid. The liquid enters the tube and any resulting pressure measurement is compromised. Given the limitation of such a sensor, it is only a viable option for appliances such as washing machines, were the sensor is immersed in the water for a relatively short period of time during each cycle, and thereafter the water drains from the washing machine tub. However, in a fuel tank application, ideally, the fuel tank would not be cyclically emptied like a washing machine. Because the sensor would be immersed in gasoline continuously, the pressure reading could be compromised when air in the tube dissolved in the gasoline and the gasoline entered the tube. Thus, the sensor would be accurate only when the fuel level is close to empty such that the fluid would not enter and rise up in the tube.

Other types of sensors can be used but also have disadvantages. For example, one known sensor, with a movable arm and float, is inserted into the fuel tank through a small hole. Frequently, the sensor is bent and damaged during installation. Furthermore, even if the sensor is threaded through the hole without damage, if the float hits the bottom of the tank, it may stick there, rendering it useless.

Accordingly, it is desirable to provide a sensor that is easy to install, provides accurate readings and has minimal risk of damage during installation and use.

In the past, two separate sensors have been used, one to measure the fuel level and the other to detect leaks. It would be desirable to reduce cost and improve the reliability of the system by providing a single sensor that could both measure the fuel level and detect leaks.

SUMMARY OF THE PREFERRED EMBODIMENTS

A fuel tank module control system is configured to measure fuel level and fuel tank vapor pressure. Preferably, the system includes an aspirator to use liquid fuel to pump vapor, an oscillator cyclically producing pressurized vapor, and a pressure sensor that alternately measures the pressurized vapor provided by the oscillator and the pressure in a fuel tank. A check valve is provided downstream of the sensor to restrict the flow of vapor in a single direction. To determine the fuel level, the differential of the square wave output of the sensor is calculated. To determine if there are any leaks in the fuel tank, the tank vapor pressure is measured when the engine is off.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE INVENTION

Figure 1:
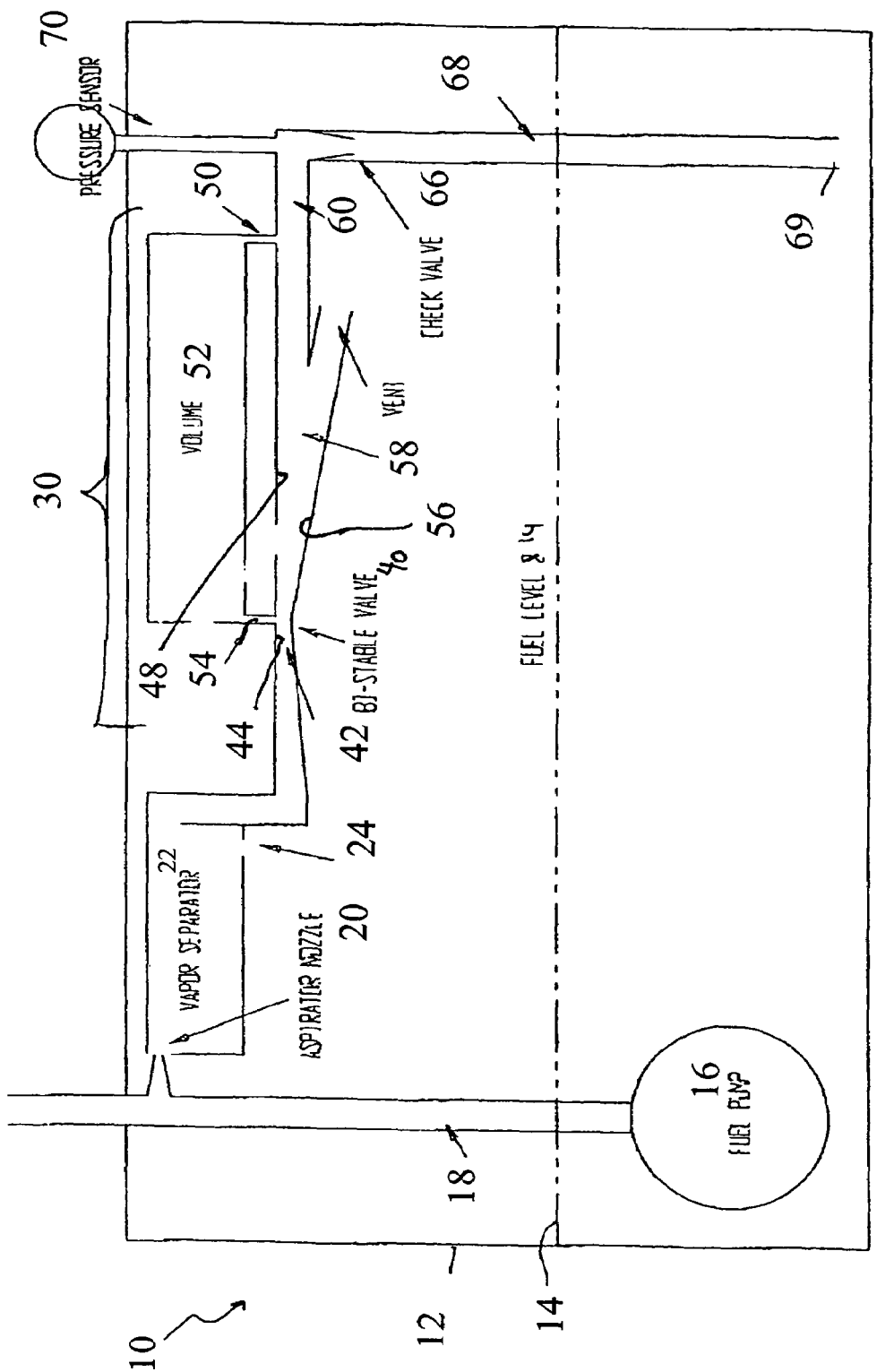
FIG. 1 depicts a preferred embodiment of the fuel tank control module of the present invention.

A preferred embodiment of the fuel tank module control system 10 of the present invention is shown in FIG. 1. A fuel tank 12 is shown with a fuel level 14 and a fuel pump 16 for pumping the fuel from the tank to the engine. The fuel level 14 is shown in FIG. 1 as being approximately half full. It is well known that, depending on the particular driver's gasoline procurement patterns, the fuel level can vary from a full tank to near empty or completely empty. The fuel pump 16 is generally an integral part of the automotive fuel system and provides the output pressure through line 18.

In a preferred embodiment of the invention, line 18 includes an aspirator nozzle 20. The fuel traveling through line 18 exits through the nozzle 20 into a vapor separator 22. Air or fuel vapor in the volume above the fuel level is aspirated through the opening around the nozzle into the vapor separator, creating a pressure in the separator. The aspirator nozzle 20 is preferably positioned at a distance above the fuel level 14 such that vapor is always available at the nozzle. In one embodiment of the invention, the aspirator is powered by excess fuel traveling through a return line to the fuel tank.

There are many types of known vapor separators and the present invention can utilize any known vapor separator that can separate the liquid fuel from fuel vapor. In the embodiment shown in FIG. 1, the vapor separator 22 is a simple volume. A drain orifice 24 is positioned at the bottom of the vapor separator. The liquid fuel drains back into the fuel tank 12 through the drain orifice 24 and the vapor fuel continues through to the oscillator, as described below.

The fuel tank module control system 10 of the present invention includes an oscillator that creates a cycling pressure. As will be described in further detail below, a sensor exposed to the cyclical pressure outputs a square wave whose amplitude is proportional to the fuel level. The fuel level measurement is thus calculated by the reading the square wave output produced by the sensor. The oscillator of the present invention can have any form and include any structure that is capable of producing a cyclical pressure. The following is a description of a preferred embodiment of the oscillator of the present invention.

In a preferred embodiment of the invention, as shown in FIG. 1, the oscillator is a fluidic valve 30. An advantage of using a fluidic valve 30 is that it has no moving parts and is, therefore, less likely to experience a mechanical failure.

The fuel vapor flows from the vapor separator 22 through nozzle 42 of a bistable valve 40. The nozzle 42 preferably has a smooth, continuous top surface 44. The bottom surface 46 is preferably angled. The top surface 44 shown in FIG. 1 is straight, however, it is possible to have the top surface 44 also positioned at an angle. The angle relationship between the top surface 44 and the bottom surface 46 is configured to urge flow through nozzle 42 to cling to the upper surface 44. This effect, referred to as the "Coanda Effect," encourages flow to remain attached to the upper surface 48 of the cavity 58, thereby pressurizing the valve discharge port 60. The nozzle 42 is designed such that the flow is biased toward the upper surface 44 and remain there until disturbed.

In a preferred embodiment of the invention, the pressurized vapor flows through the timing orifice 50 into the timing volume 52. Timing orifice 50 is preferably sized to facilitate the flow into timing volume 52. AS the pressure in the timing volume 52 increases, there is increasing flow through trigger orifice 54. The flow velocity at the trigger orifice 54 continues to increase as the pressure in the timing volume 52 rises. When the flow rate and consequently flow velocity through the trigger orifice 54 is sufficiently high, the flow attached to the upper surface 44 of nozzle 42 becomes interrupted. The vapor flowing through the trigger orifice 54 breaks the attachment of the vapor flow to the upper surface 44 and causes it to cling to the bottom surface 56 of the valve cavity 58. The vapor flow is then discharged through vent 62 into the fuel tank 12.

The pressure in the timing volume 52 will decay as the vapor exits through timing orifice 50 and trigger orifice 54. The velocity of the flow through the trigger orifice 54 will progressively decrease until the flow through nozzle 42 reattaches itself to the upper surface 44.

The above-described process creates an oscillating flow in the valve 40 and the effect is that the pressure sensor 70 is alternately exposed to a high pressure and the tank vapor pressure. For a more accurate pressure reading, the oscillation period should be long enough to allow the oscillator to stabilize between repetitions. Those of ordinary skill will be able to design the size of the timing orifice 50 and trigger orifice 54 to manipulate the range of frequency of the oscillations.

In a preferred embodiment of the invention, a check valve 66 is installed to prevent reverse flow in nozzle 40. There are many types of known check valves and it is envisioned that the present invention could include any type of check valve that would prevent reverse flow of fluid or vapor therethrough. Although ideally it would be desirable to have no reverse flow through the check valve, the present invention would operate if the check valve substantially, if not wholly, prevented reverse flow.

In the embodiment shown in FIG. 1, the check valve 66 is a fluidic valve. Flow is allowed to pass freely through the dip tube 68 having an open end 69 near the bottom of the fuel tank 12. The dip tube 68 is shown straight but it can be curved or bent to fit within the fuel tank. The diameter of dip tube 20 should be sufficiently large to prevent any clogs caused by sediments in the tank. To further decrease the risk of clogging, a filter can be utilized adjacent the aspirator nozzle 20.

The fluidic check valve prevents vapor from rising in the dip tube while the valve is in the "vent" mode. In a preferred embodiment, the exit discharge coefficient of the fluidic check valve is 1 and the enter discharge coefficient is 0.5 or less. As described further below, the check valve can also be a check ball valve or other mechanical-type check valve.

Figure 3:
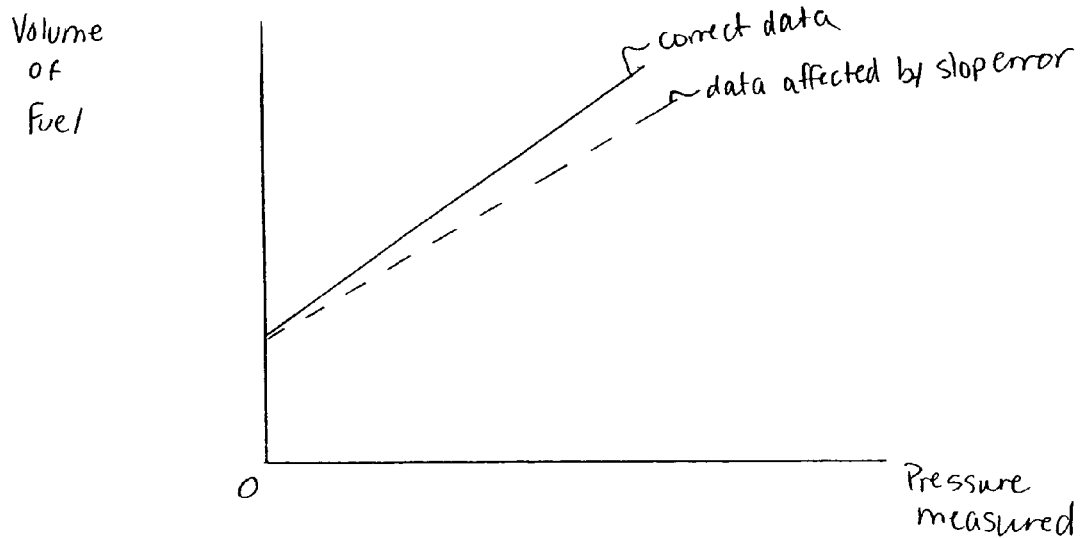
FIG. 3 is a graphical representation of the fuel volume level as a function of the measured pressure and the affect of slope errors on the measurements.
Figure 4:
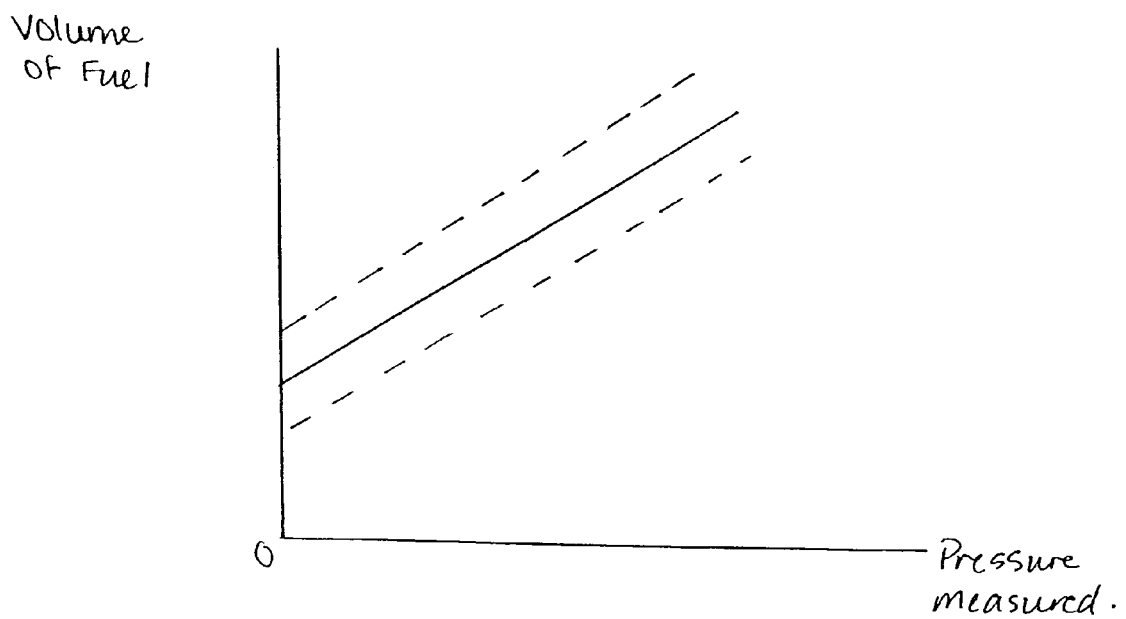
FIG. 4 is a graphical representation of the fuel volume level as a function of the measured pressure and the affect of offset errors on the measurements.

The pressure sensor 70 is alternately exposed to the fuel tank vapor pressure and to the pressure of the fuel column. The difference between the fuel tank vapor pressure and the fuel column pressure is equivalent to the pressure associated with the depth of the remaining fuel. The pressure sensor outputs a square wave whose amplitude is proportional to the fuel level. The measurement produced by utilizing the teachings of the present invention is more accurate than those produced by known methods for the following reasons. There are essentially two major areas of errors for sensors. First, there are slope errors. This type of error is depicted in FIG. 3, which shows the accurate measurement slanted with an incorrect slope. Second there are offset errors. This type of error is depicted in FIG. 4, which shows the entire curve either shifted up or down depending on the amplitude of error. Because the measurement taken by the fuel tank module control system 10 of the present invention is a differential, all offset errors are eliminated. In other words, the amplitude of the square wave is not affected by any offset because the amplitude is a differential.

With respect to the slope-type errors, as shown in FIG. 3, the errors are minimized as the tank empties. In this regard, the fuel level sensing process provides an "auto zero" at an empty tank. Typically, a driver is most interested in the fuel level, and requires greater accuracy, when the fuel level is at or near empty. The fuel tank module control system of the present invention inherently provides maximum accuracy at the lowest fuel level.

In a preferred embodiment of the invention, the same sensor 70 is also used to detect leaks in the fuel tank by measuring the fuel tank vapor pressure when the vehicle is not in use. A typical fuel tank pressure ranges from approximately −80 mbar to +120 mbar. If one were to measure the pressure due to the height of fuel in the tank, a typical pressure would be about 30 mbar (equivalent to a depth of about 12 inches). Since these pressures are reasonably close in range, it is possible to utilize a single sensor to be used to measure the fuel level and check for leaks in the fuel tank. Furthermore, the fuel tank vent system leakage is only measured when the engine is off and the fuel level is measured only when the engine is on, again making it possible to measure the fuel level and detect leaks using the same sensor. The manner in which the fuel level is measured (through the use of an oscillator) has been described above. After the fuel pump is shut off, and the engine is not running, the oscillator stops functioning and the sensor will measure the fuel tank vapor pressure, which will indicate whether there is a leak.

Figure 2:
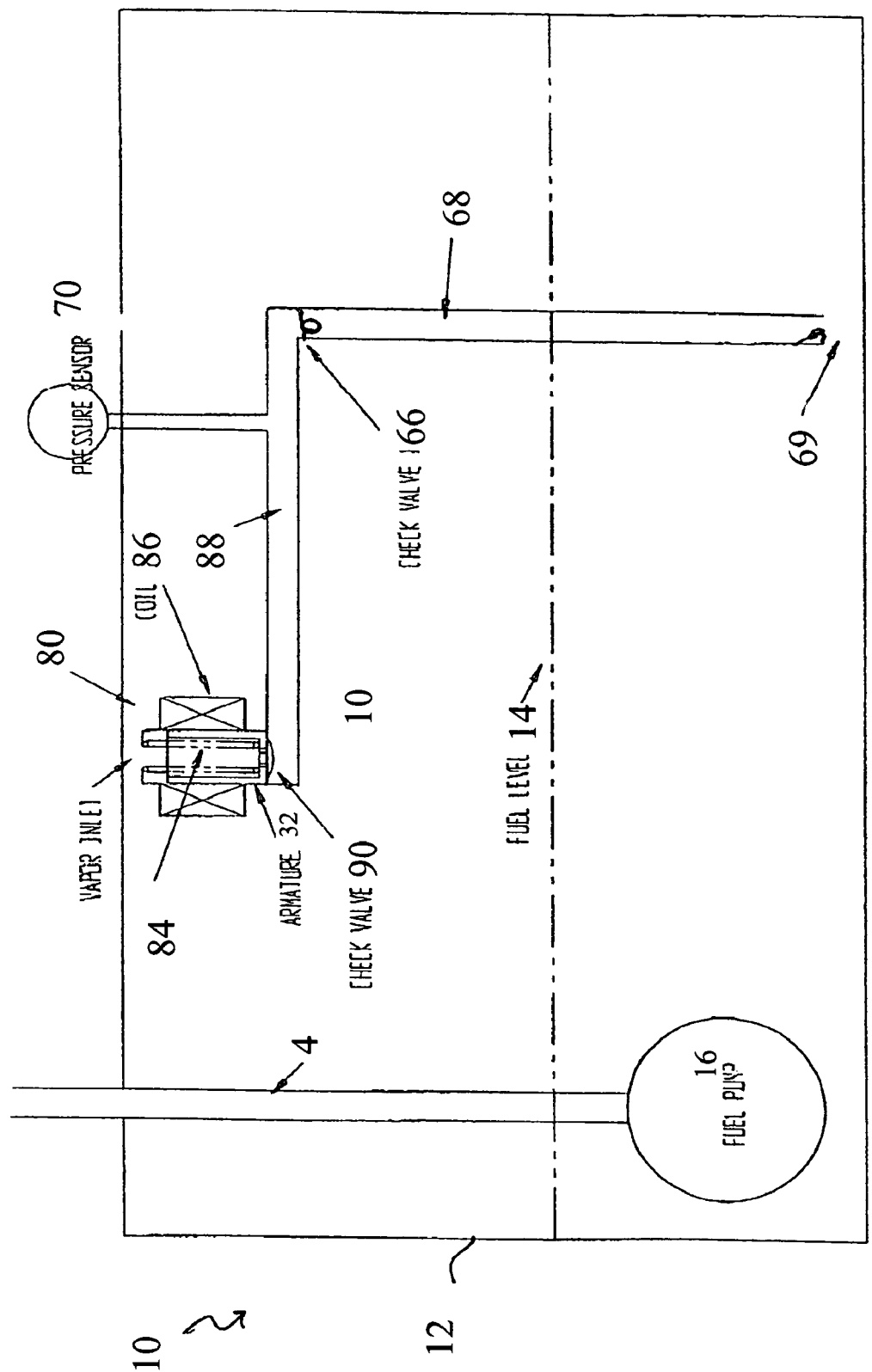
FIG. 2 depicts another preferred embodiment of the fuel tank control module of the present invention.

FIG. 2 shows another preferred embodiment of the present invention, where another preferred oscillator is shown. In this embodiment, the oscillator is an electromechanical pump 80 that supplies pressurized vapor to the pressure sensor 70. The pump 80 preferably includes an armature 82 biased in a closed position by a spring 84. A solenoid coil 86 is used to alternately apply a magnetic field to the armature 82, lifting it against the actuator spring 84. A check valve 90, preferably integral with the armature, is positioned at the bottom of the armature 82 to restrict the flow of vapor to a single direction, namely, in the direction entering passage 88. As the armature 82 lifts, the pressure sensor 70 is exposed to the ambient vapor pressure in the tank 12. When the armature 82 reaches the limit of its stroke, the current to solenoid coil 86 is shut off, and the armature 82 is forced downward by spring 84. Check valve 66 then opens, forcing the vapor in passage 88 through check valve 66 into dip tube 68, and out from the dip tube outlet 69. As the vapor exits, the sensor is exposed to the pressure in the dip tube 68. Accordingly, as the electromechanical pump 80 causes the armature 82 to go up and down, the sensor is alternately exposed to the fuel tank vapor pressure and the pressure of the fuel column.

As with the previous embodiment, the sensor also measures tank vapor pressure to detect leaks. Specifically, when the solenoid is left off, the armature check valve 90 is designed to allow sufficient leakage to allow the pressure in passage 88 to equalize with the fuel tank vapor pressure. Accordingly, to detect leaks, the solenoid remains uncharged and the sensor measures the fuel tank vapor pressure.

The embodiment shown in FIG. 2 also shows a mechanical check valve 66, which is of a ball-check type of valve. As discussed previously, other known check valves can be substituted.

The embodiments described above are exemplary embodiments of the fuel tank module control system of the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A fuel tank module control system configured to measure fuel level and fuel tank vapor pressure, the system comprising:
    an aspirator;
    an oscillator in communication with the aspirator, the oscillator cyclically producing pressurized vapor, wherein the oscillator is a fluidic valve;
    a sensor in communication with the oscillator, wherein the sensor alternately measures the pressure of the pressurized vapor provided by the oscillator and the pressure of a fuel column; and
    a check valve downstream of the sensor.

2. The system of claim 1 wherein the fluidic valve comprises:
    a valve cavity having an upper surface, wherein the pressurized vapor produced by the oscillator is biased to adhere to the upper surface of the valve cavity unless disturbed; and
    a timing orifice, a timing volume, and a trigger orifice in communication with each other;
    wherein the pressurized vapor travels through the timing orifice into the timing volume, and when a selected pressure is reached, the pressurized vapor exits the trigger orifice disengaging the pressurized vapor adhered to the upper surface of the valve cavity, and causing the pressurized vapor to exit the valve cavity.

3. The system of claim 1 wherein the check valve is a fluidic valve.

4. The system of claim 1 wherein the check valve is a mechanical valve.

5. A fuel tank module control system configured to measure fuel level and fuel tank vapor pressure, the system comprising:
    an aspirator;
    an oscillator in communication with the aspirator, the oscillator cyclically producing pressurized vapor;
    a sensor in communication with the oscillator, wherein the sensor alternately measures the pressure of the pressurized vapor provided by the oscillator and the pressure of a fuel column; and
    a check valve downstream of the sensor;
    wherein the oscillator comprises:
        a valve cavity having an upper surface, wherein the pressurized vapor produced by the oscillator is biased to adhere to the upper surface of the valve cavity unless disturbed; and
        a timing orifice, a timing volume, and a trigger orifice in communication with each other;
        wherein the pressurized vapor travels through the timing orifice into the timing volume, and when a selected pressure is reached, the pressurized vapor exits the trigger orifice disengaging the pressurized vapor adhered to the upper surface of the valve cavity, and causing the pressurized vapor to exit the valve cavity.

6. The system of claim 5 wherein the check valve is a fluidic valve.

7. The system of claim 5 wherein the check valve is a mechanical valve.

8. A fuel tank module control system configured to measure fuel level and fuel tank vapor pressure, the system comprising:
    an aspirator;
    an oscillator in communication with the aspirator, the oscillator cyclically producing pressurized vapor;
    a sensor in communication with the oscillator, wherein the sensor alternately measures the pressure of the pressurized vapor provided by the oscillator and the pressure of a fuel column; and
    a check valve downstream of the sensor;
    wherein the oscillator comprises:
        an armature having a check valve, the armature preferably biased in a closed direction; and
        a solenoid coil, wherein when the coil is charged, the armature moves in an open direction;
        wherein the solenoid coil is charged cyclically to allow the armature to alternately open and close.

9. The system of claim 8 wherein the check valve is a fluidic valve.

10. The system of claim 8 wherein the check valve is a mechanical valve.

11. A fuel tank module control system configured to measure fuel level and fuel tank vapor pressure, the system comprising:
   an aspirator;
   an oscillating means in communication with the aspirator for cyclically producing pressurized vapor, wherein the oscillating means includes
      a valve cavity having an upper surface, wherein the pressurized vapor produced by the oscillating means is biased to adhere to the upper surface of the valve cavity unless disturbed, and
      a timing orifice, a timing volume, and a trigger orifice in communication with each other
      wherein the pressurized vapor travels through the timing orifice into the timing volume, and when a selected pressure is reached, the pressurized vapor exits the trigger orifice disengaging the pressurized vapor adhered to the upper surface of the valve cavity, and causing the pressurized vapor to exit the valve cavity;
   a sensor in communication with the oscillating means, wherein the sensor alternately measures the pressure of the pressurized vapor provided by the oscillating and the pressure of a fuel column; and
   a check valve means downstream of the sensor for substantially restricting the flow to a single direction, the check valve means comprising a fluidic valve.

12. The fuel tank module control system of claim 11 wherein the oscillating means comprises:
   an armature having a check valve, the armature preferably biased in a closed direction; and
   a solenoid coil, wherein when the coil is charged, the armature moves in an open direction;
   wherein the solenoid coil is charged cyclically to allow the armature to alternately open and close.

13. The system of claim 11 wherein the check valve is a mechanical valve.

14. A method of measuring fuel tank level and fuel tank pressure, comprising the steps of:
   providing a vehicle having an engine on and an engine off configuration;
   in the engine on configuration, providing an oscillating means for cyclically producing pressurized vapor;
   alternately exposing a sensor to the pressurized vapor and the pressure of a fuel column;
   calculating the differential in the square wave output of the sensor to arrive at a fuel level measurement; and
   in an engine off configuration, detecting fuel leaks by measuring the fuel tank vapor pressure.

15. The method of claim 14 wherein the oscillation means comprises:
   a valve cavity having an upper surface, wherein the pressurized vapor produced by the oscillator is biased to adhere to the upper surface of the valve cavity unless disturbed;
   a timing orifice, a timing volume, and a trigger orifice in communication with each other; and
   wherein the pressurized vapor travels through the timing orifice into the timing volume, and when a selected pressure is reached, the pressurized vapor exits the trigger orifice disengaging the pressurized vapor adhered to the upper surface of the valve cavity, and causing the pressurized vapor to exit the valve cavity.

16. The method of claim 15 wherein the oscillation means comprises:
   an armature having a check valve, the armature preferably biased in a closed direction; and
   a solenoid coil, wherein when the coil is charged, the armature moves in an open direction;
   wherein the solenoid coil is charged cyclically to allow the armature to alternately open and close.

* * * * *